US005219095A

United States Patent [19]

Shimizu et al.

[11] Patent Number: 5,219,095

[45] Date of Patent: Jun. 15, 1993

[54] DRUG DISPENSER

[75] Inventors: Hiroyasu Shimizu; Atuo Inamura, both of Ohta, Japan

[73] Assignee: Sanyo Electric Co., Ltd., Oska, Japan

[21] Appl. No.: 845,998

[22] Filed: Mar. 4, 1992

[30] Foreign Application Priority Data

Mar. 6, 1991 [JP] Japan .................................... 3-40206

[51] Int. Cl.[5] ............................................ B65G 59/00

[52] U.S. Cl. .................................... 221/264; 221/265

[58] Field of Search ................ 221/264, 265, 263, 258

[56] References Cited

U.S. PATENT DOCUMENTS

| | | | |
|---|---|---|---|
| 3,885,703 | 5/1975 | Neavin | 221/265 X |
| 4,903,861 | 2/1990 | Yuyama | 221/265 |

FOREIGN PATENT DOCUMENTS

| | | | |
|---|---|---|---|
| 0354633 | 2/1990 | European Pat. Off. . | |
| 0412806 | 2/1991 | European Pat. Off. . | |
| 9001113 | 5/1990 | Fed. Rep. of Germany . | |
| 2625982 | 7/1989 | France | 221/265 |
| 58-46962 | 10/1983 | Japan . | |
| 63-11253 | 3/1988 | Japan . | |
| 3-69406 | 3/1991 | Japan . | |
| 3-79516 | 3/1991 | Japan . | |

*Primary Examiner*—David H. Bollinger

*Attorney, Agent, or Firm*—Weingarten, Schurgin, Gagnebin & Hayes

[57] ABSTRACT

A drug dispenser, having a drug case storing drugs and a dispensing mechanism mounted to a lower portion of the drug case. The dispensing mechanism includes an arrange body. The arrange body has a drug passageway for arranged vertically said drugs and a surface guiding the drug to the drug passageway. The dispensing mechanism includes a fixed plate provided under the arrange body. The fixed plate has a drug drop opening connected to the drug passageway. The fixed plate has a separator free to pass into an intermediate of the drug passageway. The dispensing mechanism includes a swing mechanism swinging said arrange body between a first position in which the separator closes the drug passageway and a second position in which the separator opens the drug passageway. The dispensing mechanism includes a drive for the swing mechanism. The drug storing in the drug case is aligned in the drug passageway. The separator stops the drug in the first position and enables the drug to pass into the drug drop opening one by one in the second position. The swing mechanism arranges, separates and discharges the drug, so that the drug dispenser can have a vertically elongated shape and be downsized. A drug packer receiving corresponding drug dispensers can reduce the height and increase the availability.

1 Claim, 7 Drawing Sheets

DRUG DISPENSER

BACKGROUND OF THE INVENTION

1. Field of the Invention

The present invention relates to a drug dispenser which is equipped in drug packers in hospitals or pharmacies selecting one or a few kinds of drug storing in drug dispensers in response to different recipes for patients and automatically packing the drug and which appropriately discharges a drug storing in the drug dispenser to a packing mechanism of a drug packer.

2. Description of the Related Art

Presently, kinds of tablet prescribed in hospitals and pharmacies cover a few thousands, however, the number of kinds of actually used tablets is limited to approximately 800. Accordingly, there has been used one or more tablet packer which can each contain approximately 250 kinds of tablet and automatically pack tablets simply by inputting desired recipe data by means of a control such as a personal computer.

Japanese Utility Model Publication No.58-46962 discloses a prior-art tablet packer comprising a casing, an upper portion of the casing containing a drug container, a lower portion of the casing containing a packing mechanism unit with a conical hopper and a shutter both provided intermediate the drug container and the packing mechanism unit, the drug container containing a plurality of tablet cases in the form of rectangular parallelepiped stacked vertically and horizontally by kinds of tablet, the tablet cases being driven by means of inputting predetermined pickup signal to discharge corresponding kinds of tablets which are delivered into the hopper through a tablet drop passageway, the hopper subsequently delivering one bag of tablets to a packing mechanism unit by the operation of the shutter.

The packing mechanism unit comprises a roller on which a previously double-folded heatsealable packing paper is rolled up, a tension roller, a vertical heatsealer vertically heatsealing the packing paper to form continuous open-topped small bags arranged longitudinally of the packing paper, a horizontal heatsealer horizontally heatsealing the open tops of the open-topped bags after tablets have been shot into the open-topped bags, and feed rollers.

The feed rollers are intermittently driven to dispense the packing paper. The vertical heatsealer forms the continuous open-topped bags, the shutter is then opened to shoot the tablets and the horizontal heatsealer then seals the open tops of bags holding the tablets, when the feed rollers stop dispensing the packing paper.

Japanese patent publication No.63-11253 discloses a tablet dispenser equipped in such tablet packer, appropriately discharging tablets contained in the tablet dispenser and delivering the tablets to a packing mechanism unit. This tablet dispenser comprises: a tablet case; a rotatable disc one side surface of which is opposite to the tablet case; a plurality of ribs arranged with suitable angular spacings on the periphery of the surface of the rotatable disc opposite to the tablet case; retainers mounted on the rotatable disc in association with the spacings so as to reciprocate radially of the rotatable disc to retain and push tablets; a partition plate provided between the rotatable disc and the tablet case and having an opening of which a diameter is larger than that of the rotatable disc so as to pass tablets into a spacing defined by the ribs, a surface of the partition plate opposite to the ribs having a fixed wall surrounding and substantially fitting the ribs; a tablet outlet defined in the fixed wall so as to face a predetermined tablet discharge position; an elastic plate mounted on an object provided outside the fixed wall so as to close the tablet outlet from the outside of the fixed wall, the elastic plate being pushed by a tablet pushed out by one of the retainers to open the tablet outlet; a magnet and a reed switch; a shielding plate shielding the reed switch from the magnet in response to the closing operation of the elastic plate; and a control continuously urging the retainers towards the center of the rotatable disc and controlling the reciprocation of each of the retainers in association with the rotation of the rotatable disc so that the retainer which has reached the tablet discharge position by a rotation of the rotatable disc extends to the tablet outlet through a spacing between adjacent ribs.

This tablet dispenser has advantages in that it ca discharge securely tablets one by one by the operation of the rotatable disc, easily detect the discharge of each tablet and speed up the dispensation of tablets. However, since the tablet dispenser has a structure in which a drive including the rotatable disc and the tablet case are integrally paralleled with each other, the tablet dispenser must have the form of a rectangular parallelepiped approximate to cube and a large bottom area. When a tablet packer receives these tablet dispensers, the tablet dispensers must be stacked, so that the tablet packer entails a problem that the height of the tablet packer must be increased. This problem causes a problem that when refilling upper tablet dispensers with tablets it is very difficult for a shorter man or woman to do so. This problem also causes a problem that when tablets are dropped from tablet dispensers and in particular upper tablet dispensers to a hopper through a tablet drop passageway the tablets experience a large impact and are broken. This problem also causes a problem that since tablets discharged from tablet dispensers drop to the hopper through the tablet drop passageway common with the tablet dispensers some or all of the tablets may fly out through a spacing from which a tablet dispenser has been removed, so that a person cannot refill an empty tablet dispenser with tablets during operation of the tablet packer.

Therefore, a primary object of the present invention is to provide a drug dispenser which reduces the height of a drug packer receiving corresponding drug dispensers so as to improve the accessibility of the drug packer and precluded a break of the drug caused by a drop of a tablet from the drug dispenser to maintain the quality of the drug and which a person can refill with a drug during operation of the drug packer.

Another object of the present invention is to provide a structurally simple drug dispenser which can compactly receive a dispensing mechanism unit although a drug dispenser vertically extends and which has a small component number.

SUMMARY OF THE INVENTION

A drug dispenser of the present invention comprises: a drug case storing many drugs; a dispensing mechanism mounted to a lower portion of said drug case, said dispensing mechanism including an arrange (or arranger) body, the arrange body having a drug passageway and a surface guiding the drug to the drug passageway; said dispensing mechanism including a fixed plate provided under the arrange body, the fixed plate having a drug drop opening connected to the drug passageway, the fixed plate having a separator free to pass into and out of an intermediate of the drug passageway; said dispensing mechanism including a swing mechanism swinging the arrange body between a first position in which the separator closes the drug passageway and a second position in which the separator opens the drug passageway; and said dispensing mechanism including a drive means for the swing mechanism, whereby the drug storing in said drug case is arranged in the drug passageway and the separator stops the drug in the first position and enables the drug to pass into the drug drop opening one by one in the second position.

According to the present invention, the swing mechanism having a smaller space than a prior art rotary mechanism separates and discharges the drug and a smaller number of components such as an eccentric pin connected to the drive and a connection connecting the eccentric pin to the drug arrange body easily constitute the swing mechanism. Thus, the drug dispenser can have a small bottom area and be easily vertically elongated and a horizontal array of vertical drug dispensers can largely reduce the height of a drug packer receiving the array of vertical drug dispensers and enhance the accessibility of the drug packer when the capacity of the drug dispenser and the number of drug dispensers of the array are equal to those of a prior art drug packer.

DESCRIPTION OF THE PREFERRED EMBODIMENTS

Preferred embodiments of the present invention will be hereinafter described with reference to the drawings.

Figure 4:
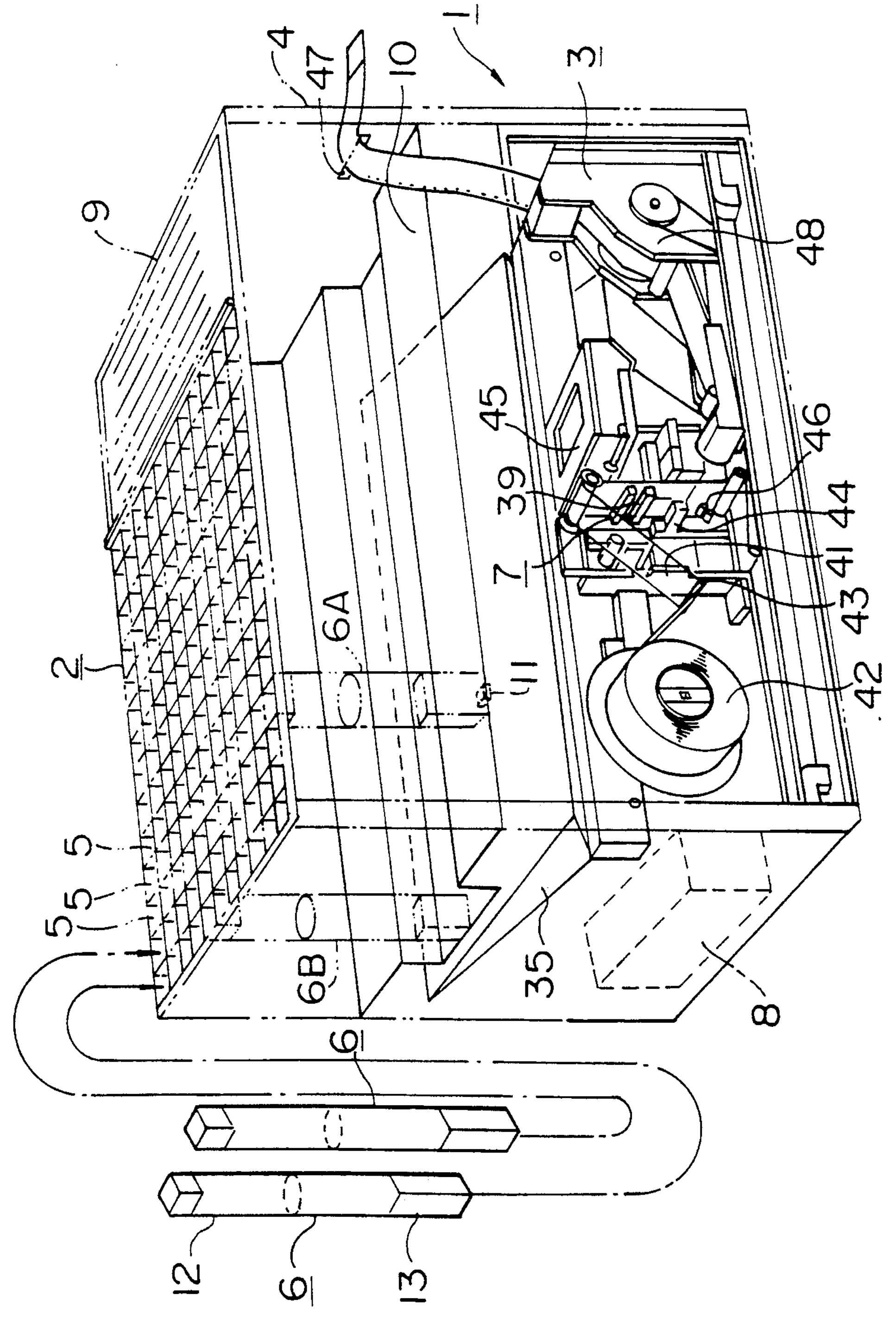
FIG. 4 is a perspective view of a tablet packer.

In FIG. 4, a tablet packer is indicated at 1. The tablet packer 1 comprises a casing 4 an upper portion of which constitutes a tablet dispenser receiving unit 2 and a lower portion of which contains a tablet packing mechanism unit 3, a plurality of tablet dispenser units 6 vertically elongated and inserted into grid eyes defined by partition plates 5 of the tablet dispenser receiving unit 2 arrayed in the form of grid, the tablet dispenser units 6 being horizontally arrayed, a tablet shooter 7 shooting a predetermined number of tablets taken out of the lower portions of selected ones of the tablet dispenser units 6 together into tablet-packing small bags, and a controller 8 controlling the operations of the tablet dispenser units 6 and the tablet shooter 7. The tablet packer 1 finally seals tablets in the tablet-packing bags.

The top of the tablet packer casing 4 has a sliding door 9 provided thereon. The sliding door 9 is moved to an open position to open the top of the tablet packer casing 4 so that partition plates 5 arrayed in the form of grid and the tops of tablet dispenser units 6 inserted into grid eyes defined by the partition plates 5 appear. The partition plates 5 are united to modules of arrays of 12 rows in depth and 10 columns (however, the numbers of rows and columns are not restricted to 12 and 10, respectively). Accordingly, one module of partition plates 5 provides 120 grid eyes so that the grid eyes of the one module can receive 120 of tablet dispenser units 6 (i.e., 120 kinds of tablet). Combining appropriate numbers of modules provides tablet dispenser unit receiving grids for 120, 240, 360 and 480 kinds of tablet. A stepped base plate 10 is mounted in the tablet packer casing 4 under the tablet dispenser unit receiving grid of partition plates 5. The base plate 10 extends in the direction of the width of the tablet packer casing 4 and has a central groove extending along the axis of the base plate 10. Portions of the base plate 10 with which the bottoms of the tablet dispenser units 6 are in contact have electrical connectors 11 mounted thereon. The tablet dispenser units 6 are inserted into the electrical connectors 11 to electrically connect with the control 8 so that the tablet dispenser units 6 and the control 8 exchange drive signals and sensing signals therebetween.

The base plate 10 can support two kinds of tablet dispenser units 6A and 6B with different lengths shown in alternate long and short dash lines in FIG. 4 because the stepped structure of the base plate 10, so that the tablet dispenser units 6A and 6B can receive appropriate numbers of tablets even when sizes of the tablets are different.

Figure 1:
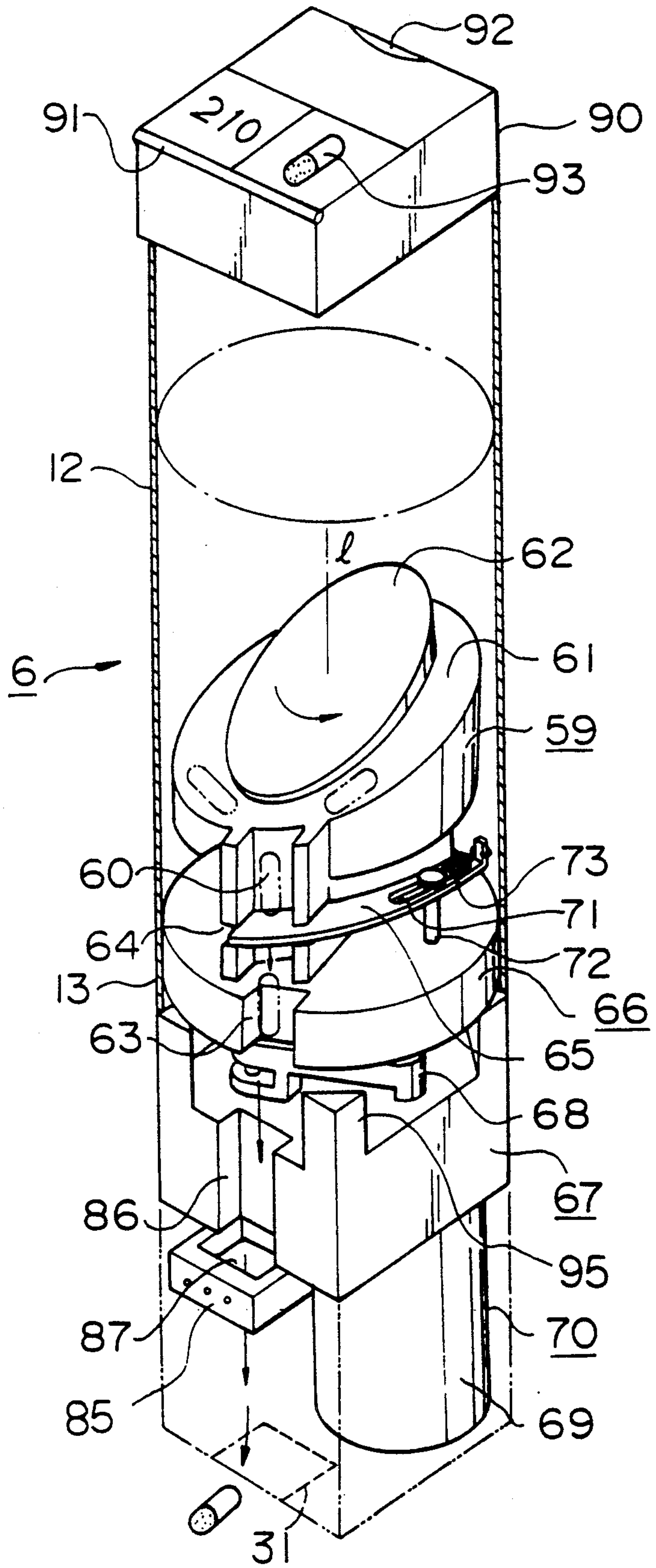
FIG. 1 is a perspective view of a tablet dispenser with a separator in operational position.
Figure 2:
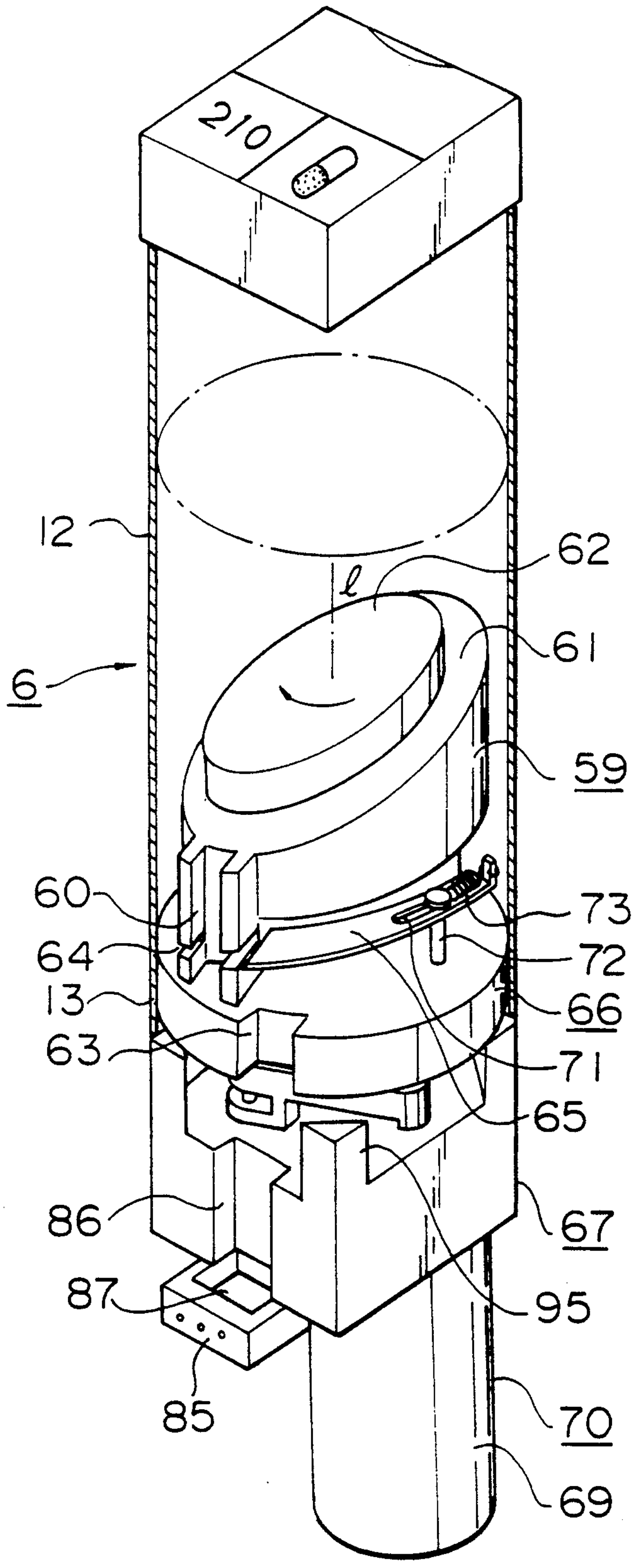
FIG. 2 is a perspective view of the tablet dispenser with the separator out of operational position.

As shown in FIGS. 1 and 2, each of the tablet dispenser units 6 has a columnar shape (300 mm long). An upper portion of the tablet dispenser unit 6 has a removable transparent tablet case 12 in the form of hollow round cylinder storing tablets and having a 46 mm diameter. A lower portion of the tablet dispenser unit 6 has a removable dispensing mechanism unit 13 having a frame in the form of square pole.

The dispensing mechanism unit 13 comprises; a one-piece tablet arrange body 59, a side of the tablet arrange body 59 having a vertical channel 60 vertically aligning plurality of tablets, the tablet arrange body 59 comprising an oblique guiding surface 61 sloping downward to the vertical channel 60, the arrange body 59 comprising a circular boss 62 projecting from the central portion of the guiding surface 61 to define a tablet guiding passageway in the guiding surface 61 around the cylindrical surface of the circular boss 62; a fixed disc 66 arranged under the tablet arrange body 59 and having a groove 63 in the circumference through which tablets drop and a separator 65 passing into and out of slits 64 defined intermediate opposite walls defining the vertical channel 60; a frame 67 in the form of a substantially square pole; a swing mechanism 68 mounted on the frame 67 and reciprocally swinging the arrange body 59 about the axis ( of the arrange body 59 between a first position shown in FIG. 1 in which the separator 65 passes into the slits 64 to fully close the vertical channel 60 and a second position shown in FIG. 2 in which the separator 65 fully opens the vertical channel 60; and a drive means 70 comprising a speed reducer of gear wheels (not shown) which is mounted in the frame 67, the drive means 70 driving the swing mechanism 68, and a direct current motor 69 mounted on the underside of the frame 67.

Figure 3:
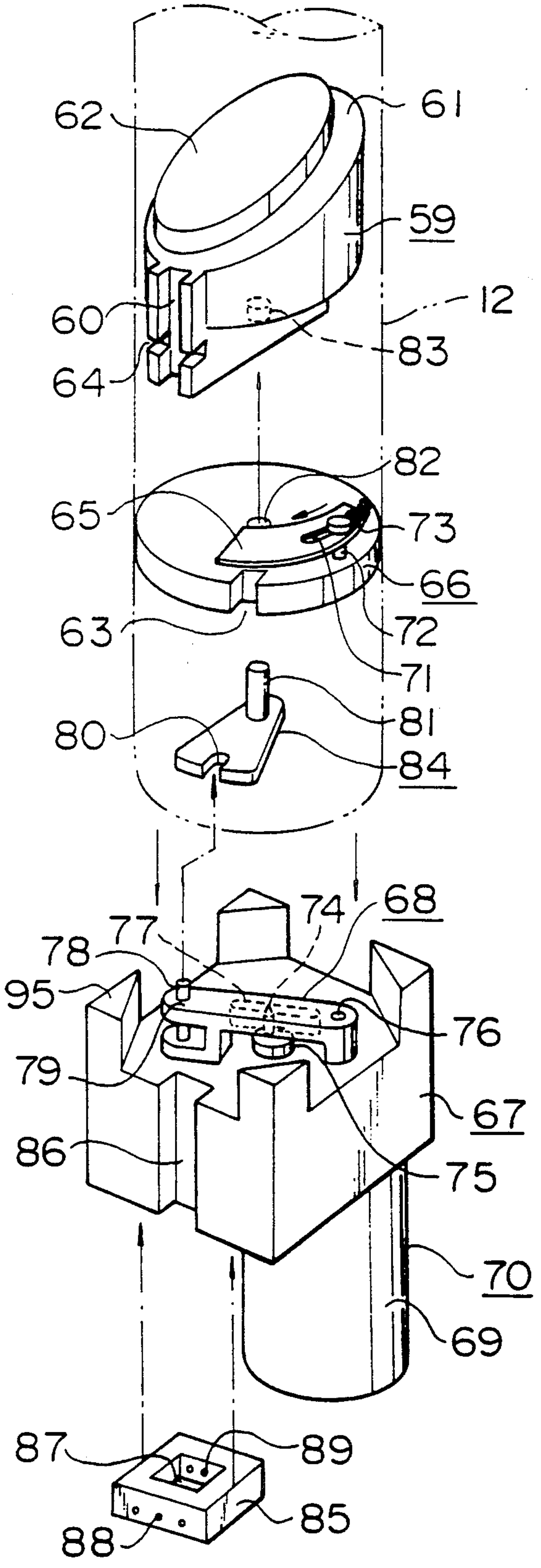
FIG. 3 is an exploded perspective view of a dispensing mechanism unit.

The separator 65 mounted above the fixed disc 66 is supported on the fixed disc 66 by means of an erect pin 72 passing through a slot 71 in the separator 65 and urged by a spring 73 to the place immediate above the groove 63 as shown in FIGS.1, 2 and 3.

As shown in FIG.3, the swing mechanism 68 comprises: a turntable 75 having an eccentric pin 74 connected to the shaft of the direct current motor 69 by means of the speed reducer of gear wheels; an elongate swing plate 79, one end of the swing plate 79 being pivotably mounted on an erect pin 76, a groove 77 defined in a central portion of the underside of the swing plate 79 engaging the eccentric pin 74, the other end of the swing plate 79 having a vertically extendible and contractible swing pin 78 projecting upward from the top surface of the swing plate 79; and a connection 84 in the form of a circular sector, a notch 80 at the circular edge of the connection 84 engaging the swing pin 78, a support shaft 81 projecting from the top surface of the other end of the swing plate 79 and passing through a central through hole 82 in the fixed disc 66, the support shaft 81 fitting a hole 83 defined in the underside of the arrange body 59.

A tablet discharge sensor 85 in the form of square ring mounted to the underside of the frame 67 faces the lower open edge of a tablet-dropping passageway 86 defined in a side of the frame 67. As best shown in FIG. 3, a plurality of phototransmitters 88 are opposite to the same number of photoreceivers 89 through the central hole 87 of the tablet discharge sensor 85. Tablets pass through the central hole 87 to intercept light from the phototransmitters 88 to cause the tablet discharge sensor 85 to produce a tablet discharge signal.

The arrange body 59 and the fixed disc 66 of the dispensing mechanism unit 13 are mounted in the tablet case 12. As shown in FIG.3, the tablet dispensing mechanism unit 13 can be easily disassembled into a subassembly mounted on the top surface of the connection 84 including the connection 8 and a subassembly mounted on the underside of the connection 84. The open top of the tablet case 12 has a box-type cap 90 mounted thereon. A person can lift up the top plate of the cap 90 about a pivot 91 by means of a handle 92 to open the top of the tablet case 12. The upper surface of the top plate of the cap 90 bears an identification number for the tablet dispenser unit 6. The cap 90 contains a sample tablet 93 which is visible from above a transparent panel mounted in the top plate of the cap 90.

In the operation of the tablet dispenser unit 6, once the control 8 receives a tablet discharge signal, the direct current motor 69 of the drive means 70 moves and the swing plate 79 converts a revolution of the turntable 75 into swing. The connection 84 transmits the swing of the swing plate 79 to the arrange body 59. The arrange body 59 horizontally reciprocates about the axis ( of the arrange body 59 between the first position shown in FIG.1 in which the separator 65 fully closes the vertical channel 60 and the second position shown in FIG. 2 in which the separator 65 fully opens the vertical channel 60

Generally, tablets storing in the tablet case 12 are moved along the guiding surface 61 into the vertical channel 60. When the arrange body 59 is in the first position shown in FIG.1, the separator 65 blocks a tablet at the lowest position of a mass of tablets intermediate the vertical channel 60. When the arrange body 59 is subsequently moved to the second position shown in FIG.2, the vertical channel 60 removes from the separator 65 and the tablet blocked by the separator 65 at the lowest position of the mass of tablets drops onto the fixed disc 66. Then, the arrange body 59 is moved to the first position shown in FIG., so that the separator 65 releases the tablet mounted thereon to a lower portion of the vertical channel 60. The tablet drops through the groove 63 defined in the fixed disc 66 and through the tablet-dropping passageway 86 to be discharged from the tablet dispenser unit 6. In this case, since the dropping tablet passes through the hole 87 of the tablet discharge sensor 85, the tablet discharge sensor 85 sends to the control 8 a signal indicating that one tablet has been discharged from the tablet dispenser unit 6.

The reduction ratio of the speed reducer of gear wheels mounted in the frame 67 is selected to approximately 1/100. One revolution of the turntable 75 produces one reciprocation (two strokes from the first position of FIG. 1 to the second position of FIG. 2 and subsequently from here to the first position of FIG. 1) of the swing plate 79 to discharge one tablet from the tablet dispenser unit 6. A time required for the one reciprocation of the swing plate 79 is 0.4–0.5 s. The tablet on the separator 65 quickly drops onto the fixed dics 66 immediately when the separator 65 has opened the vertical channel 60 and is separated from the other portion of the mass of tablets immediately when the separator 65 has closed again the vertical channel 60.

Thus, since the swing mechanism unit 68 having a small stroke can securely perform the series of alignment, separation and discharge of tablets, the size of the dispensing mechanism 13 can be smaller than that of a prior art rotary dispensing mechanism and the tablet dispenser unit 6 can be downsized.

Since the swing mechanism unit 68 can comprise a small number of simple components such as the swing plate 79 and the separator 65, the structure of the tablet dispenser unit 6 can be simplified.

Since the tablet case 12 and the dispensing mechanism 13 of the tablet dispenser unit 6 can be separated from each other, the accessibility (e.g., cleanability) of the tablet case 12 can be enhanced. Since the swinging pin 78 of the swing plate 79 can be engaged with the notch 80 in the connection 84 simply by manually rotating the connection 84 provided in the tablet case 12 when the tablet case 12 is mounted on the dispensing mechanism 13 which has been mounted in the tablet packer 1 and since four corner projections 95 projecting upwards from the four corners of the frame 67 guide the outer cylindrical surface of the lower end of the tablet case 12, the tablet case 12 can be easily smoothly inserted into the frame 67.

Figure 5:
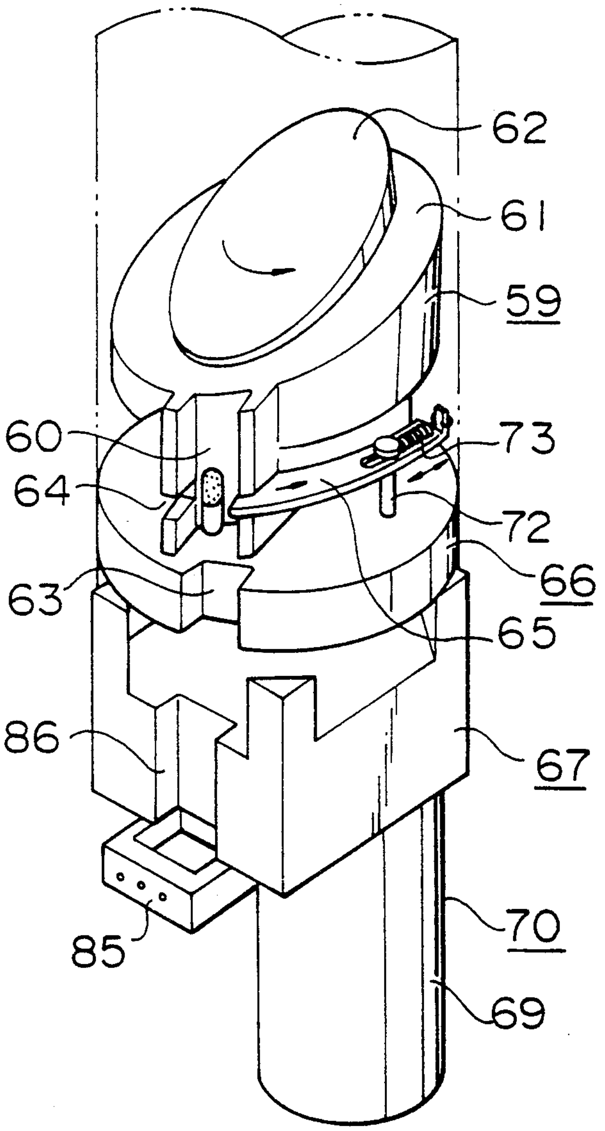
FIG. 5 is a perspective view of a main part of the tablet dispenser with a tablet held between one of opposite walls defining a vertical channel and the separator.

Since the spring 73 continuously urges the separator 65 to the place immediate above the groove 63 in the direction of an arrow as shown in FIG. 3, the separator 65 is displaced away from the first position of FIG. 1 against the force of the spring 73 to protect the tablet when a wall of the vertical channel 60 remote from the separator 65 and the front edge of the separator 65 hold therebetween the tablet at the lowest end of the mass of tablets as shown in FIG. 5. The separator 65 enables the held tablet to drop in the next swing of the arrange body 59.

The embodiment of the present invention in which the intermediate of the vertical channel 60 of the arrange body 59 has been described above, however, the present invention is not restricted to the above embodiment. The present invention has substantially the same advantages when it is so embodied that an intermediate of a separator 96 has a notch 97 and a tablet on the front end of the separator 86 closing the vertical channel 60 is dropped when the arrange body 59 is swung so that an intermediate of the vertical channel 60 coincides with the notch 97.

In the above embodiments of the present invention, a plurality of tablets are continuously aligned in the vertical channel 60. When the size and the shape of tablet are different, the height of the horizontal slits 64 defined in the opposite walls of the vertical channel 60 and the height of the erect pin 72 are easily changed so that a tablet dispenser unit 6 can cope with different sizes and shapes of tablets.

Figure 6:
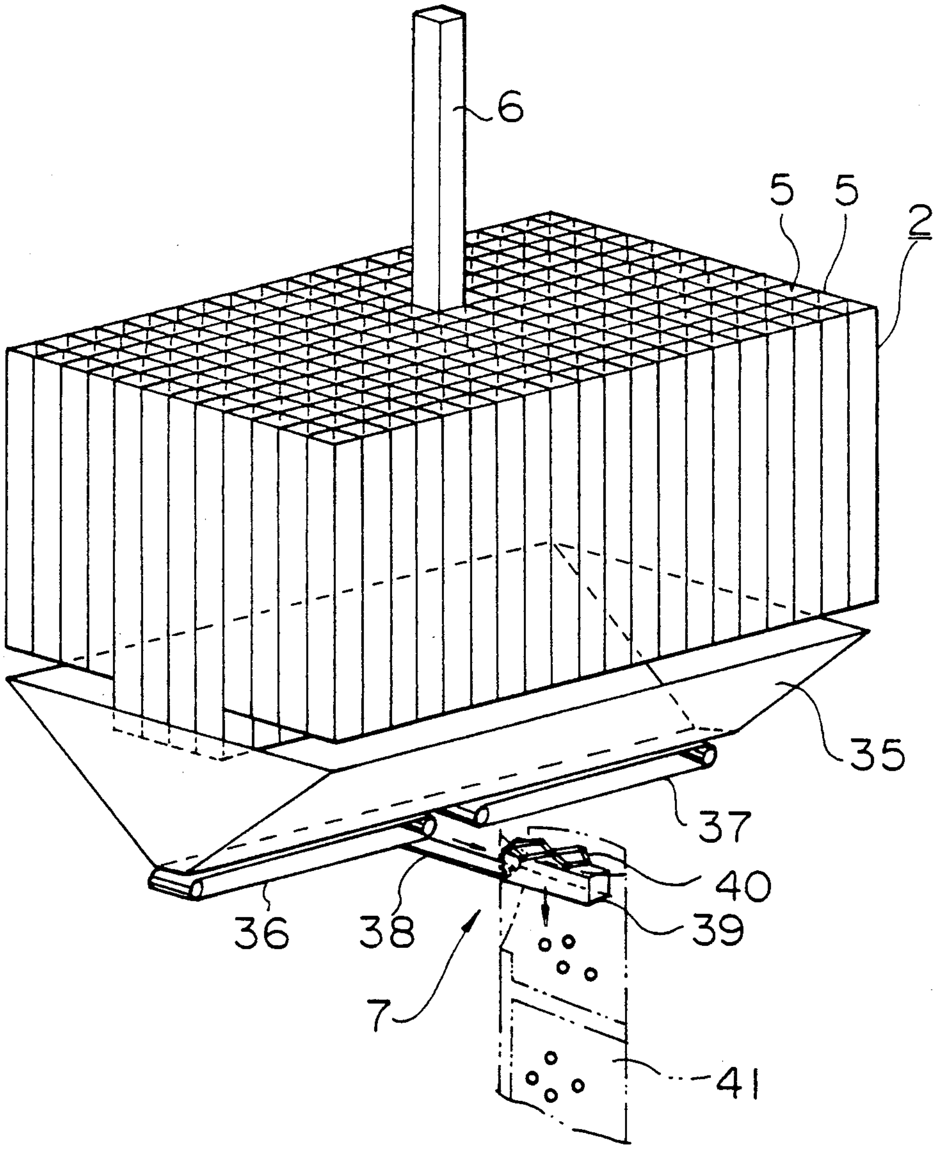
FIG. 6 is a perspective view of an arrangement of an array of tablet dispensers and a tablet shooter.
Figure 7:
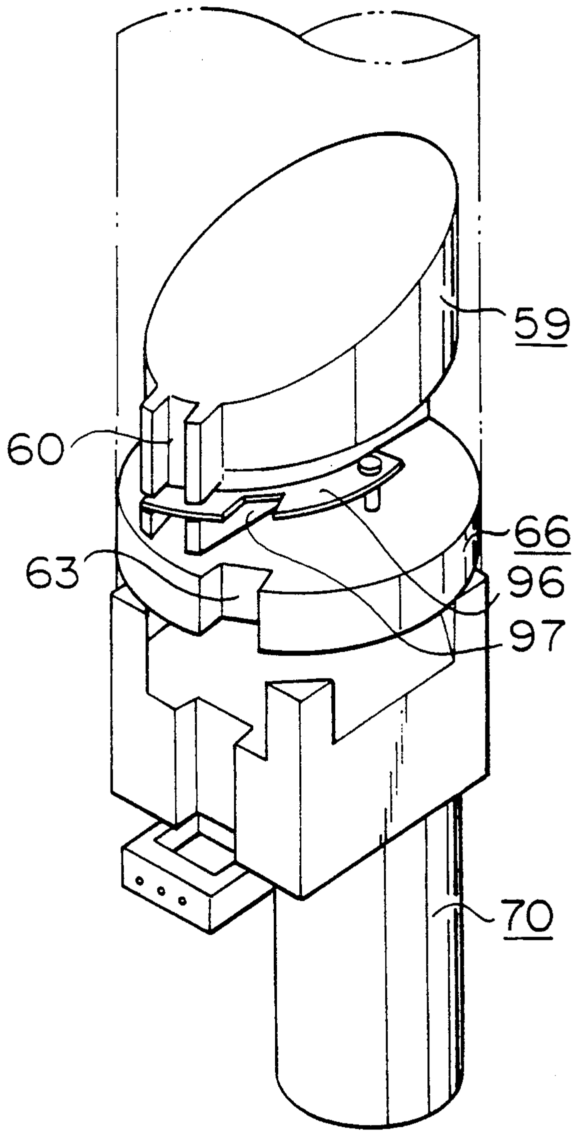
FIG. 7 is a perspective view of a main part of a tablet dispenser of a second embodiment of the present invention.

As shown in FIGS. 4 and 6, the tablet packer 1 comprises a hopper 35 extending in the direction of the width of the tablet packer 1 and having a triangular cross section. The hopper 35 guides tablets discharged from the tablet dispenser unit 6 to the central bottom hole of the hopper 35 extending in the direction of the axis of the hopper 35. The hopper 35 engages the tablet packer casing 4 so that a person can remove the hopper 35 from the tablet packer casing 4 without the need for any tools. A pair of belt conveyors 36 and 37 are positioned under the bottom of the hopper 35 so that the internal ends of the belt conveyors 36 and 37 opposite to each other at the place immediate under the center of the bottom of the hopper 35. Thus, the belt conveyors 36 and 37 collect tablets dropped from the bottom hole of the hopper 35 to the belt conveyors 36 and 37 to the central spacing between the internal ends of the belt conveyors 36 and 37.

The table shooter 7 comprises a container 39 movable between the front and the rear of the tablet packer 1 and opening a bottom plate 38 when the movable container 39 is at the front end of the movement, and a bag opening expander 40 expanding the opening of the open top of each of the opentopped bags for holding tablets before the movable contain 39 is inserted into the open-topped bag. Once the belt conveyors 36 and 37 collect one bag of tablets in the movable container 39, the movable container 39 horizontally travels to the front end of the movement and there opens the bottom plate 38 to shoot the one bag of tablets into an open-topped bag.

The packing mechanism unit 3 comprises a supply roller 42 on which a previously double-folded heatsealable packing sheet 41 is rolled up, a tension arm 43, a T-shaped heatsealer 44 heatsealing the packing sheet 41 in the form of T to produce continuous open-topped bags, a printer 45 printing predetermined matters such as recipe data on each open-topped bag, feed rollers 46 intermittently feeding the continuous bags, and a conveyor 48 conveying the continuous bags each sealing in one bag of tablets to a tablet bag outlet 47 provided above the conveyor 48. The packing mechanism unit 3 operates as follows: The feed rollers 46 are intermittently driven by a motor (not shown) to feed the packing sheet 41. The T-shaped heatsealer 44 heatseals in the form of T an area between adjacent bags to be formed and a half of the open top of an empty bag to produce a bag of which an upper half of the open top is open and the lower half of the open top is heatsealed when the feed rollers 46 stop. The movable container 39 holding one bag of tablets passes into a bag through the upper half of the open top of the bag while the bag opening expander 40 expands the opening of the upper half of the open top of the bag. The movable container 39 opens the bottom plate 38 and shoots the one bag of tablets into the bag. The T-shaped heatsealer 44 heatseals the open upper half of the open top of the bag to produce a fully heatsealed bag containing the tablets. Then, the printer 45 prints recipe data on the open-topped bag while the tablet shooter 7 shoots one bag of tablets into the bag. Finally, the conveyor 48 carries the continuous bags containing tablets to the tablet bag outlet 47. The packing sheet 41 passes vertically downwards through the tablet shooter 7 in such a manner that the crease on the packing sheet 41 runs on the front side of the packing sheet 41, as shown in FIG. 1.

Thus, since the tablet dispenser unit 6 has a generally vertical columnar shape so as to have a small bottom area, corresponding erect tablet dispenser units 6 can be compactly horizontally arrayed when the tablet dispenser units 6 are mounted in the tablet packer 1. The height of the tablet packer 1 is largely reduced even if the volume of each table dispenser unit 6 and the number of arrayed tablet dispenser units 6 are equal to those of a prior art tablet packer, so that the accessibility of the tablet packer 1 is enhanced. In addition, since all of tablet outlets 31 of tablet dispenser units 6 are positioned at lower portions of the tablet dispenser units 6 and substantially horizontally arrayed above the hopper 35 when the tablet dispenser units 6 are mounted in the tablet packer 1, the tablet dispenser units 6 discharge tablets into the hopper 35 from positions much lower than the prior art tablet dispenser units. Thus, the tablet dispenser unit 6 much reduces a damage in a tablet to be caused by a drop of the tablet and a drop time so that the tablet packer 1 can speed up its operation.

The horizontal array of erect tablet dispenser units 6 eliminates a prior art tablet dropping passageway common with the tablet dispenser units 6 and precludes tablets from flying out of a spacing from which a tablet dispenser unit 6 has been removed during operation of the tablet packer 1. Since the upper portion of each table dispenser unit 6 comprises the tablet case 12, a person can easily refill an empty tablet dispenser unit 6 during operation of the tablet packer 1 without pulling out the tablet dispenser unit, so that the availability of the tablet packer 1 can be increased.

What is claimed is:

1. A drug dispenser, comprising:

a drug case storing drugs;

a dispensing mechanism mounted to a lower portion of said drug case;

said dispensing mechanism including an arrange body having a pair of walls which define a drug passageway for vertically arranging said drugs, having a guide surface for guiding the drugs to said drug passageway and having a horizontal slit in each of said walls which define said drug passageway, and said arrange body moveable between a first position and a second position;

said dispensing mechanism including a fixed plate provided under the arrange body, the fixed plate having a drug drop opening aligned with said drug passageway when said arrange body is in said first position, the fixed plate having a separator mounted thereto, said separator disposed on said fixed plate to pass through said horizontal slits and said separator for separating first and second portions of said drug passageway;

said dispensing mechanism including a swing mechanism for alternately swinging said arrange body between said first position in which said separator separates the first portion of the drug passageway from the second portion of the drug passageway and said second position in which said separator does not separate the first and second portions of the drug passageway; and said dispensing mechanism including a drive means for driving the swing mechanism, whereby the drug storing in said drug case is arranged in the drug passageway and the separator stops the drug in the first portion of said drug passageway when said arrange body is in said first position and the separator enables the drug to pass into said drug drop opening one by one when said arrange body is in said second position.

* * * * *

UNITED STATES PATENT AND TRADEMARK OFFICE

CERTIFICATE OF CORRECTION

PATENT NO. : 5,219,095

DATED : June 15, 1993

INVENTOR(S) : Hiroyasu Shimizu, et al

It is certified that error appears in the above-indentified patent and that said Letters Patent is hereby corrected as shown below:

TITLE PAGE

In the Abstract, line 12, "said" should read --the--.

Column 2, line 17, "ca" should read --can--.

Column 4, line 56, "(" should read --$\ell$--.

Column 5, line 36, "connection 8" should read --connection 84--.

Column 5, line 53, "(" should read --$\ell$--.

Column 5, line 57, "60" should read --60.--.

Column 6, line 21, "dics" should read --disc--.

Column 6, line 62, after "59" insert --is swung to coincide with the front end of the separator 65--.

Column 6, line 67, "86" should read --96--.

UNITED STATES PATENT AND TRADEMARK OFFICE

CERTIFICATE OF CORRECTION

PATENT NO. : 5,219,095

DATED : June 15, 1993

INVENTOR(S) : Hiroyasu Shimizu, et al

It is certified that error appears in the above-indentified patent and that said Letters Patent is hereby corrected as shown below:

Column 6, line 67, "86" should read --96--.

Signed and Sealed this

Twenty-third Day of August, 1994

Attest:

BRUCE LEHMAN

*Attesting Officer*

*Commissioner of Patents and Trademarks*